US012131218B2

(12) United States Patent
Barkan et al.

(10) Patent No.: US 12,131,218 B2
(45) Date of Patent: Oct. 29, 2024

(54) BI-OPTIC BARCODE READER HAVING A WEIGH PLATTER AND AN IMAGING ASSEMBLY AT A DISTAL EDGE OF THE WEIGH PLATTER

(71) Applicant: ZEBRA TECHNOLOGIES CORPORATION, Lincolnshire, IL (US)

(72) Inventors: Edward Barkan, South Setauket, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 6 days.

(21) Appl. No.: 17/877,489

(22) Filed: Jul. 29, 2022

(65) Prior Publication Data
US 2024/0037358 A1    Feb. 1, 2024

(51) Int. Cl.
  *G06K 7/10*  (2006.01)
  *G06K 7/14*  (2006.01)
(52) U.S. Cl.
  CPC ......... *G06K 7/1096* (2013.01); *G06K 7/1443* (2013.01)
(58) Field of Classification Search
  CPC .................................................. G06K 7/1096
  See application file for complete search history.

(56) References Cited

U.S. PATENT DOCUMENTS

| 2010/0127082 | A1* | 5/2010 | Drzymala | G06K 7/10722 235/462.41 |
| 2010/0282850 | A1* | 11/2010 | Olmstead | G06K 7/10722 235/440 |
| 2012/0318869 | A1* | 12/2012 | Edmonds | G06K 7/10792 235/462.14 |
| 2013/0306727 | A1* | 11/2013 | Shearin | G06K 7/10 235/440 |
| 2013/0327831 | A1* | 12/2013 | Howard | G06K 7/1096 235/440 |
| 2020/0058199 | A1 | 2/2020 | Barkan et al. | |
| 2021/0192163 | A1 | 6/2021 | Handshaw et al. | |
| 2021/0374373 | A1 | 12/2021 | Astvatsaturov et al. | |

OTHER PUBLICATIONS

International Search Report and Written Opinion for International Application No. PCT/US2023/28330 mailed on Oct. 5, 2023.

* cited by examiner

*Primary Examiner* — Suezu Ellis
(74) *Attorney, Agent, or Firm* — Yuri Astvatsaturov

(57) ABSTRACT

Described herein are barcode readers having a housing with upper and lower portions, and a weigh platter. Additionally, the barcode readers include a first imaging assembly having a first imaging sensor, the first imaging assembly having a first field of view (FOV) directed through at least one of the substantially horizontal window or the substantially upright window of the housing, and a second imaging assembly having a second imaging sensor, the second imaging assembly having a second FOV and being positioned near the distal edge of the weigh platter that is opposite the upper portion of the barcode reader housing.

47 Claims, 6 Drawing Sheets

BI-OPTIC BARCODE READER HAVING A WEIGH PLATTER AND AN IMAGING ASSEMBLY AT A DISTAL EDGE OF THE WEIGH PLATTER

BACKGROUND

Bi-optic barcode readers are commonly used in retail and grocery store venues to help facilitate various transaction. In particular, these bi-optic barcode readers rely on image data captured by one or more image sensors to conduct image analysis and perform various functions based on that analysis. In light of this, there is a continued need for further development associated with the ability to gather image-based data for bi-optic barcode reader use.

SUMMARY

In an embodiment, the present invention is a barcode reader comprising: a housing having (i) a lower housing portion with an upper surface facing a product scanning region and a substantially horizontal window and (ii) an upper housing portion extending above the lower housing portion with a substantially upright window; a weigh platter configured to support an object placed on the weigh platter for obtaining a weight of the object, the weigh platter having: a central region extending in a transverse plane, the central region including a platter window configured to permit light to pass therethrough; a proximal edge adjacent the upper housing portion; a first lateral edge extending non-parallel to the proximal edge; a second lateral edge, opposite the first lateral edge, extending non-parallel to the proximal edge; and a distal edge, opposite the proximal edge, extending non-parallel to the first and second lateral edges; a first imaging assembly having a first imaging sensor, the first imaging assembly having a first field of view (FOV) directed through at least one of the substantially horizontal window or the substantially upright window; and a second imaging assembly having a second imaging sensor, the second imaging assembly having a second FOV and being positioned near the distal edge of the weigh platter.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
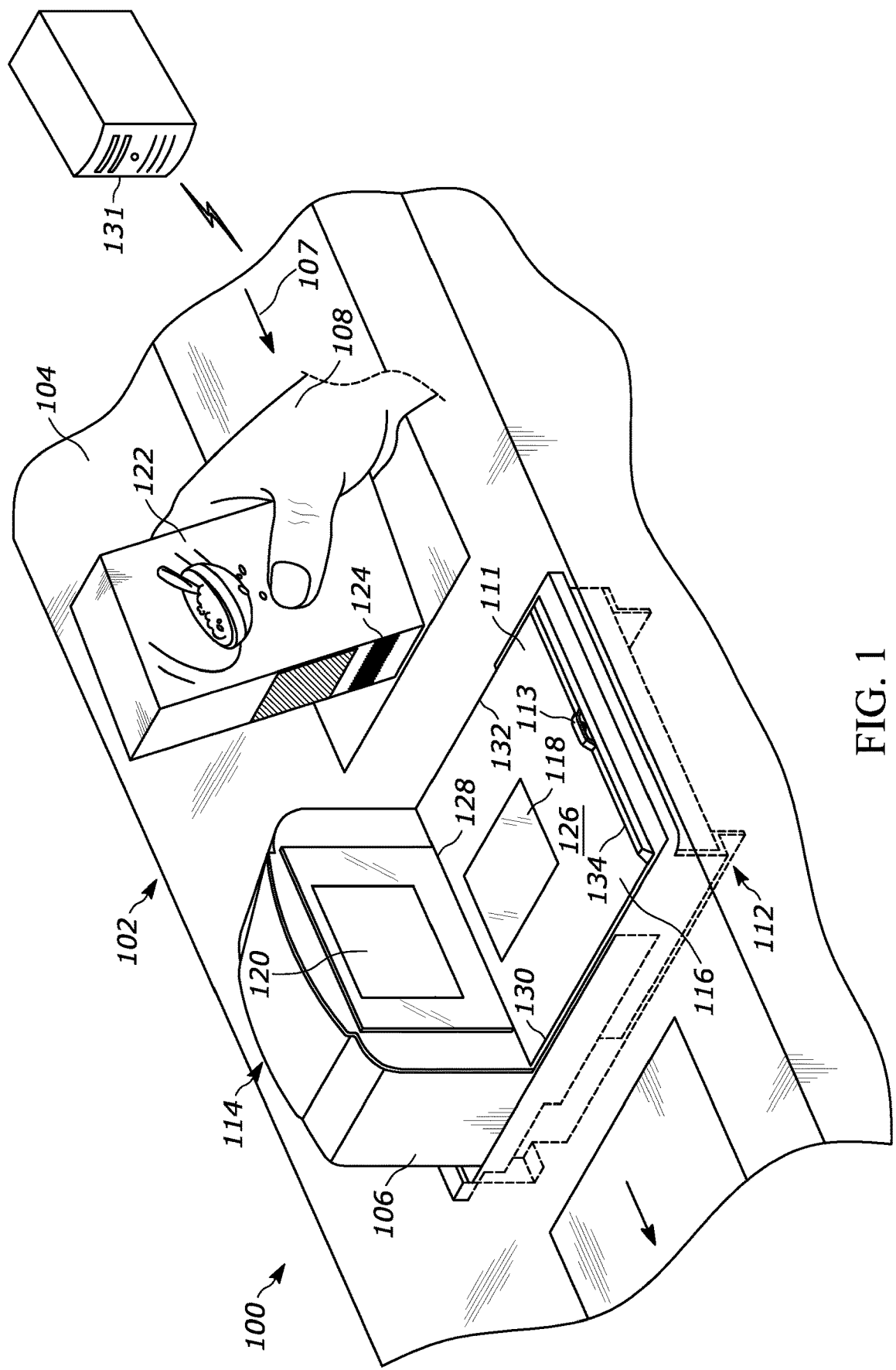
FIG. 1 is a perspective view of an example imaging system, implemented in an example point-of-sale (POS) system, having a bi-optical (also referred to as "bi-optic") barcode reader having a weigh platter.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

FIG. 1 illustrates a perspective view of an example imaging system capable of implementing operations of the example devices. In the illustrated example, an imaging system 100 is in the form of a point-of-sale (POS) system, having a workstation 102 with a workstation surface (e.g., a counter) 104 and a bi-optical (also referred to as "bi-optic") barcode reader 106.

In the illustrated example, the barcode reader 106 includes an upper housing 114 (also referred to as an upper portion, tower portion, or upper housing portion) and a lower housing 112 (also referred to as a lower portion, platter portion, or lower housing portion). The upper housing 114 is characterized by an optically transmissive window 120 positioned there along a generally vertical plane and a horizontally extending field of view(s) which passes through the window 120. The lower housing 112 is characterized by a weigh platter 111 that includes an optically transmissive window 118 positioned there along a generally horizontal plane and a vertically extending field of view(s) which passes through the window 118. The weigh platter 111 is a part of a weigh platter assembly that will generally include the weigh platter 111 and a scale configured to measure the weight of an object placed on an example surface of the top portion 116, or some portion thereof. While in some instances the weigh platter 111 is fixedly secured to the lower housing 112, in other implementations it is removable by the barcode reader operator. This can be done to, for example, clean under the platter or to replace the platter after wear and tear. Additionally, an optical assembly 113 may be positioned near an edge of the weight platter 111, providing another view of an item being passed through a product scanning region. As used herein, the term near should at least be interpreted as being within two inches from a given feature. In other implementations, the term near should at least be interpreted as being within one inch, half inch, or quarter inch from a given feature.

In operation, a user 108 generally passes an item 122 across a product scanning region of the barcode reader 106 in a swiping motion in the general direction 107, which in the illustrated example is right-to-left. It should be appreciated that while items may be swiped past the barcode reader 106 in either direction, items may also be presented into the product scanning region by means other than swiping past the window(s). When the item 122 comes into the any of the fields of view of the reader, the barcode 124 on the item 122 is read and decoded by the barcode reader 106 and corresponding data is transmitted to a communicatively coupled host 131. In other instances, items may need to be weighed in order to be added to the ledger of the transaction. In this case, an item is placed on the top surface 116 of the platter 111 for the barcode reader 106 to sense the weight of said item and transmit information associated with this weight to the host 131. Additionally, image data may be processed for other purposes, such as, for example, potential ticket switching, sweethearting, or other types of shrink-related events. Further to that, image data captured by various imaging assemblies may be used for other purposes like, transitioning from a stand-by mode to a reading mode (i.e., waking up a scanner).

In a preferred embodiment the weigh platter 111 of the barcode reader 106 has various features. Specifically, it includes a central region 126 extending in a transverse plane. In most cases the central region 126 includes a platter window 118 configured to permit light to pass therethrough. This light may both, be emitted from within the lower housing 112 and travel into the interior of the lower housing 112 for capture by various imaging components. The weigh platter 111 further includes a series of edges which, in the illustrated example, include a proximal edge 128 adjacent the upper housing portion 114, a first lateral edge 130 extending non-parallel to the proximal edge 128, a second lateral edge 132 opposite the first lateral edge 130 and extending non-parallel to the proximal edge 128, and a distal edge 134 opposite the proximal edge 128 and extending non-parallel to the first and second lateral edges 130, 132. In the illustrated embodiment, the proximal, lateral, and distal edges for a substantially square shape. However, other shapes are within the scope of this disclosure and the edge arrangement can, for example, result in the weight platter 111 having a substantially rectangular shape whereby lateral edges 130 and 132 are longer than the perpendicularly positioned proximal and distal edges 128 and 134. Similarly, the edge positioning can result in the weigh platter having other regular or irregular shapes.

Figure 2:
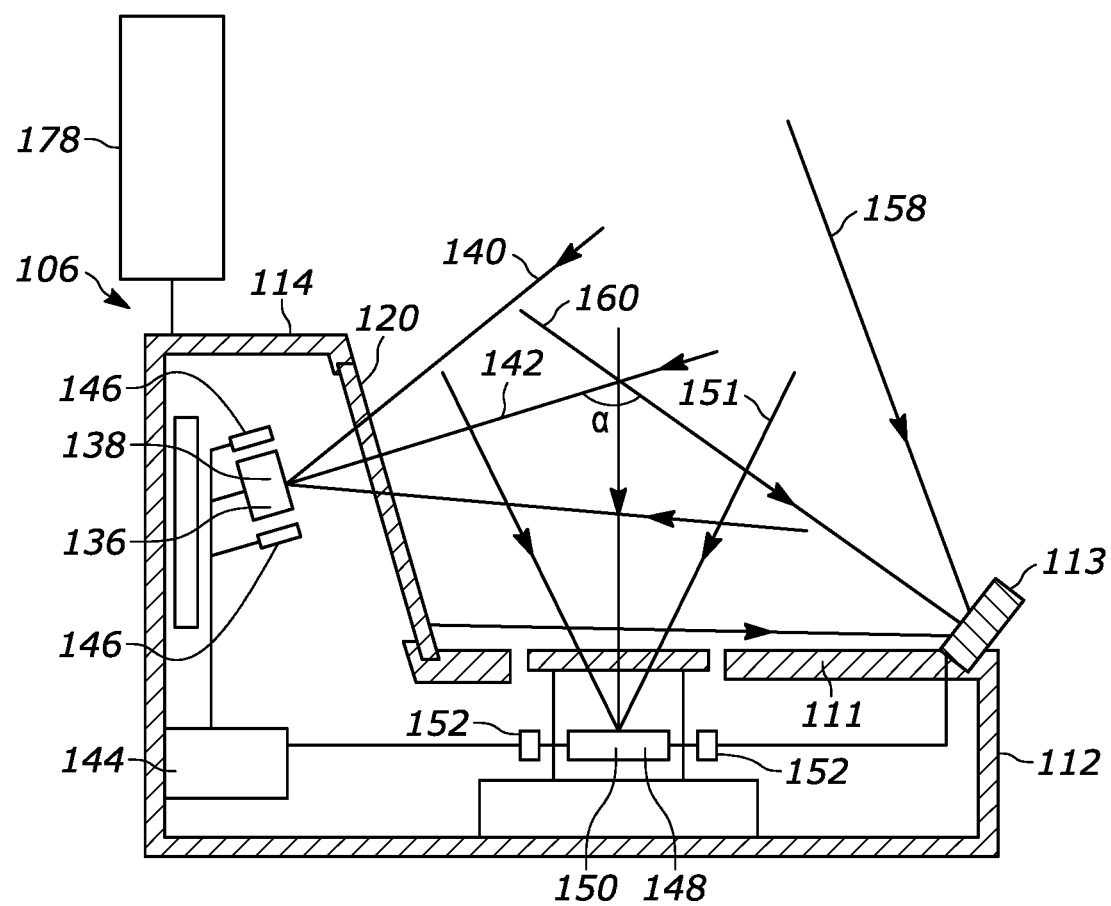
FIG. 2 is a schematic block diagram of an example barcode reader in accordance with an embodiment of the present invention.

As can be seen in the block diagram of FIG. 2, the barcode reader 106 includes a first imaging assembly 136 that includes a first imaging sensor 138 with a respective imaging lens or lens group. Imaging sensor 138 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by the respective lens group over an imaging field of view (FOV) 140 along an imaging axis 142 that is normal to the substantially flat image sensor 138 through the substantially upright window 120. The return light is scattered and/or reflected from an item over the FOV. In some embodiments, the imaging axis is coaxial with a central axis of the lens group. The lens group is operative for focusing the return light onto the array of pixels to enable the characteristics (e.g., barcode(s)) associated with the item to be read. In particular, the light that impinges on the pixels is sensed and the output of those pixels produce image data that is associated with the environment that appears within the FOV (which can include the target). This image data may be processed by a controller 144 (e.g., by being sent to a decoder) which identifies and decodes decodable indicia captured in the image data. Once the decode is performed successfully, the reader can signal a successful "read" of the target (e.g., a barcode).

In addition to the imaging sensor 138, the imaging assembly 136 can include one or more illumination sources 146 operable to provide light that is directed into the product scanning region through the substantially upright window 120. Under typical conditions, when the imaging sensor 138 is operating to capture light from the product scanning region to produce image data, illumination sources 146 are activated to provide illumination of the target and hence enhance visibility of the target as "seen" by the imaging sensor 138. In a preferred embodiment, the one or more illumination sources 146 comprise a light emitting diode (LED) that is synchronized, at least partially, with the exposure of the imaging sensor 138.

It should be appreciated that the barcode reader 106 can be configured with one or more primary imaging assemblies that direct various FOVs through the combination of the substantially vertical and substantially horizontal windows 120, 118. To that end, if a single imaging assembly is used, various mirror arrangements can be employed to split the assembly's FOV and direct one portion of that FOV through window 120 and direct another portion of that FOV through windows 118. This can include one or more splitter mirrors and/or one or more folding mirrors whereby the various portions of the FOV can be directed in a desired manner.

Alternatively, multiple imaging assemblies can be used. For example, the barcode reader 106 can employ another imaging assembly 148 that is similar in operation to imaging assembly 136. That is, the imaging assembly 148 can include another imaging sensor 150 along with a respective lens or lens group and one or more illumination sources 152 operable to provide light that is directed into the product scanning region through the substantially horizontal window 118. Under typical conditions, when the imaging sensor 150 is operating to capture light from the product scanning region over FOV 151 to produce image data, illumination sources 152 are activated to provide illumination of the target and hence enhance visibility of the target as "seen" by the imaging sensor 150. In a preferred embodiment, the one or more illumination sources 152 comprise a light emitting diode (LED) that is synchronized, at least partially, with the exposure of the imaging sensor 150.

While not expressly illustrated, it should be appreciated that the position and orientation of the imaging assemblies disclosed herein are merely exemplary, and unless otherwise indicated, these assemblies can be positioned anywhere within the upper and lower housing along with any mirrors which allow for any of the one or more FOVs to be redirected in a desired manner.

Figure 3:
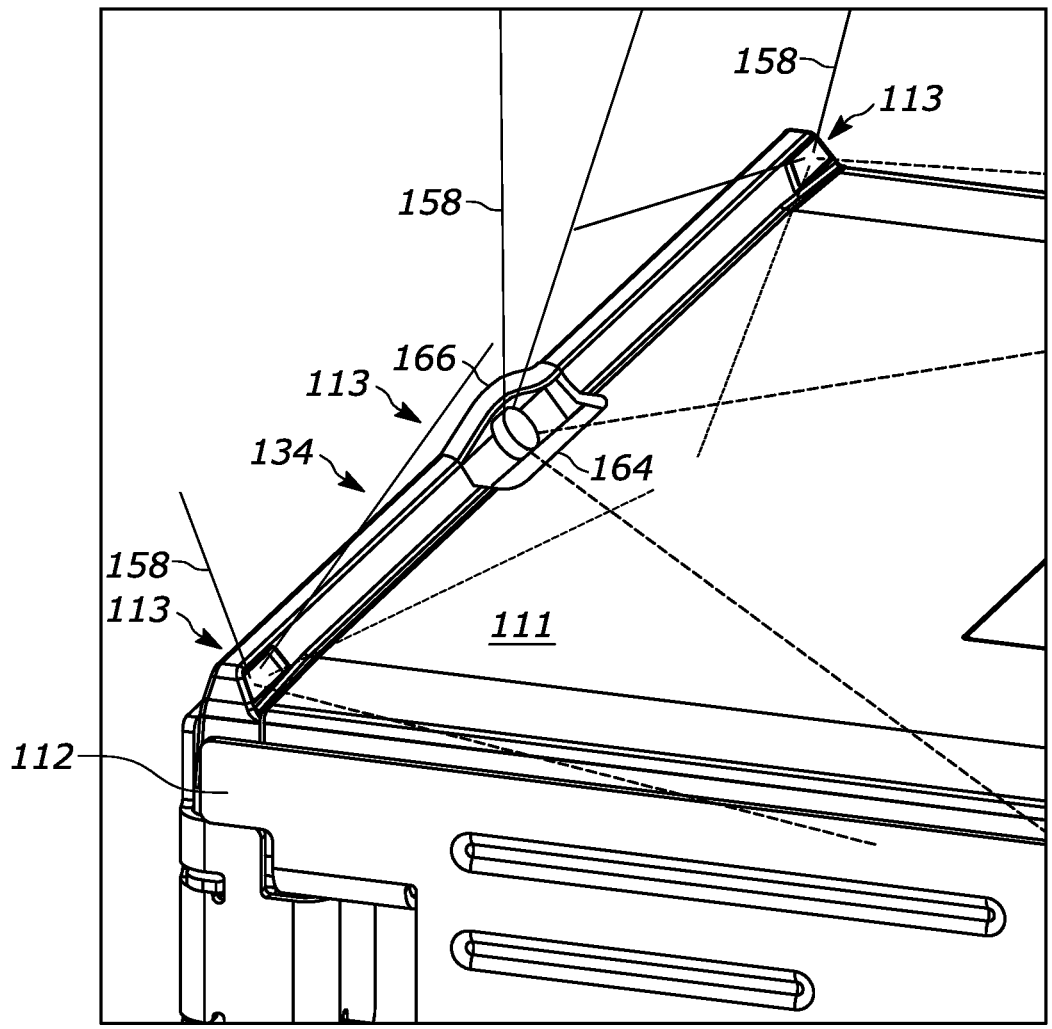
FIG. 3 is a perspective view of a distal portion of an exemplary weigh platter for used with the barcode reader of FIG. 1 together with an imaging assembly positioned near thereto.
Figure 4:
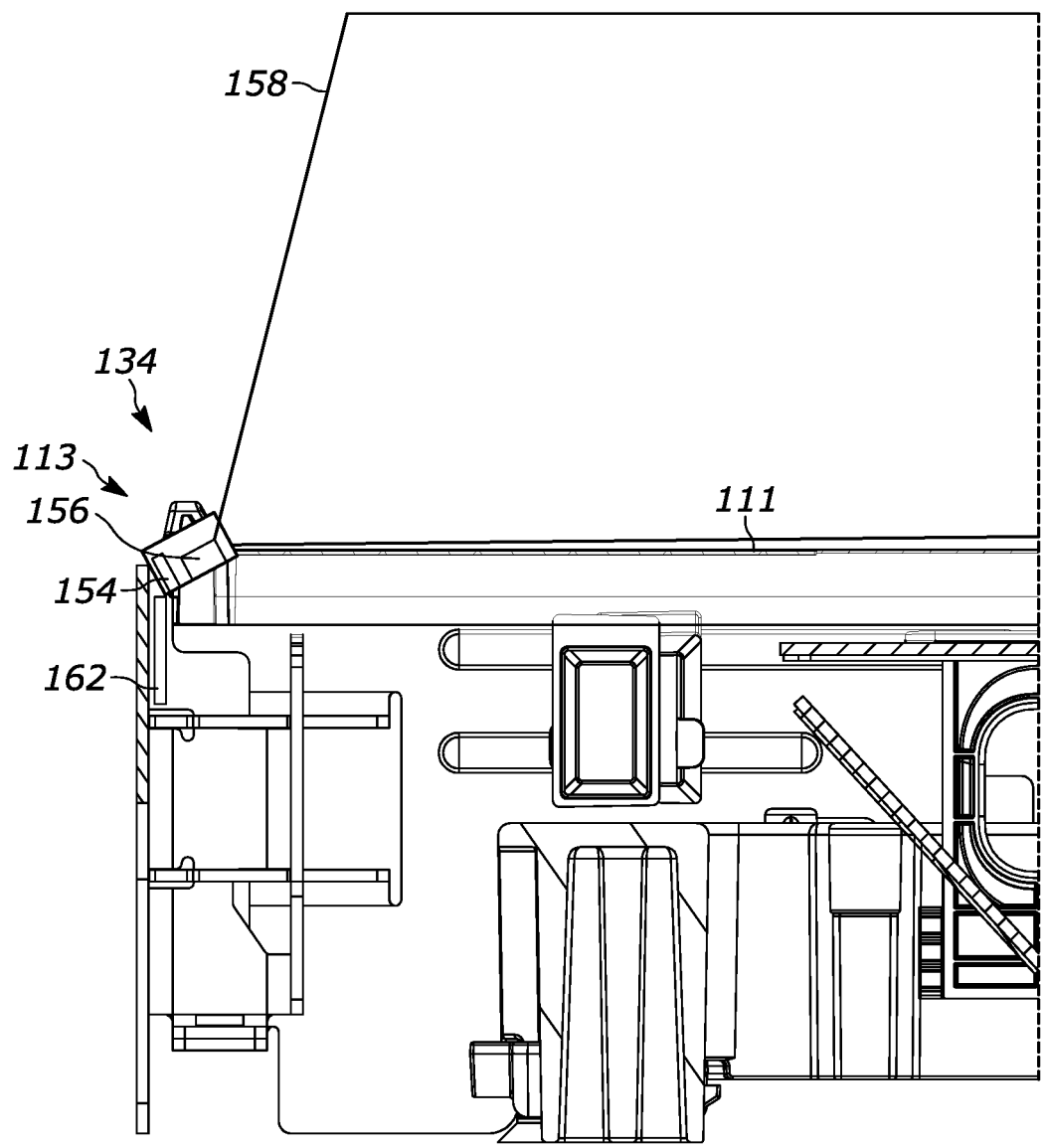
FIG. 4 is a cross-section view with a superimposed schematic block diagram of a portion of an example barcode reader in accordance with an embodiment of the present invention.
Figure 5:
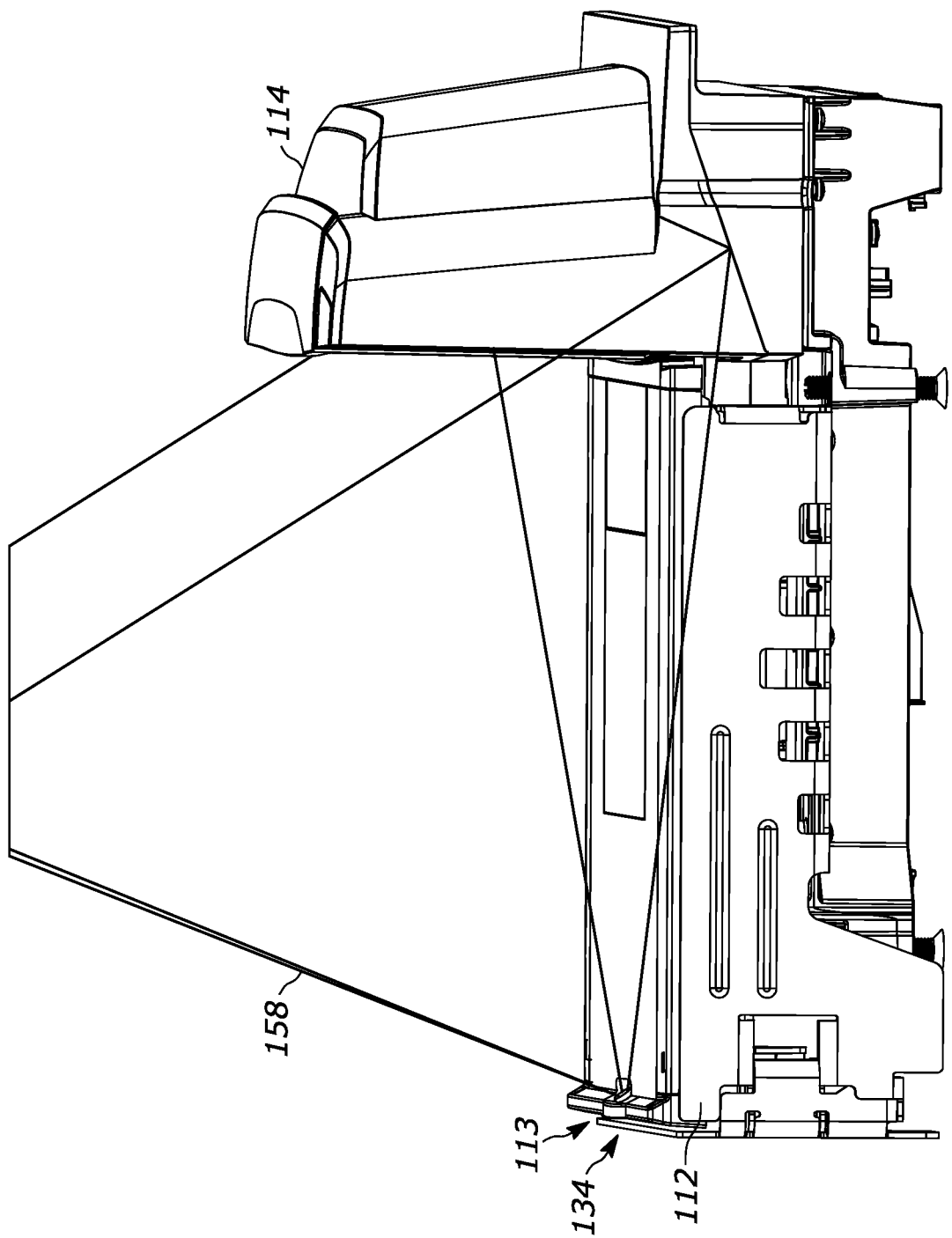
FIG. 5 is a side perspective view of an example barcode reader in accordance with an embodiment of the present invention.

Turning now to FIGS. 3 and 4, the bi-optic barcode reader 106 also includes a secondary imaging assembly 113 positioned near the distal edge 134 of the weigh platter 111. As with other imaging assemblies, the secondary imaging assembly 113 includes a respective imaging sensor 154 with a respective imaging lens or lens group 156. Imaging sensor 154 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by the respective lens group over an imaging field of view (FOV) 158 along an imaging axis 160 that is normal to the substantially flat image sensor 154. The return light is scattered and/or reflected from objects over the FOV. In some embodiments, the imaging axis is coaxial with a central axis of the lens group 156. The lens group 156 is operative for focusing the return light onto the array of pixels to enable focused capture of image data of an environment appearing within the FOV 158. In particular, the light that impinges on the pixels is sensed and the output of those pixels produce image data that is associated with the environment that appears within the FOV (which can include the target). This image data may be processed by the controller 144. Additionally or alternatively, it may be processed by a separate controller 162 which may be located on its respective substrate. Furthermore, controllers 144 and 162 may be communicatively coupled with each other to enable desired functionality.

In some embodiments the imaging assembly 113 can be formed, at least partially, as a part of the weigh platter 111. This, however, may be less desirable due to the fact that in a preferred embodiment the weigh platter only maintains contact with the weight measuring elements of the barcode reader (e.g., load arm of the scale). Thus, any additional elements which may cause a drag on the sensed weight could create operational problems related to inaccurate weighing of items. Still, in some embodiments the weigh platter 111 may comprise at least some portion of the imaging assembly 113 such that communication to/from the imaging assembly 113 and/or power being supplied thereto are transferred wirelessly.

In other embodiments the weigh platter 111 may include a transparent cover to shield the imaging assembly 113 from debris or items being dragged across the platter. In this implementation, the imaging assembly 113 along with the supporting circuit board are supported by the lower housing portion 112. To enable the imaging assembly 113 to have an appropriately directed FOV, it is preferable to position at least a portion thereof above the top surface of the platter 111. As such, the weigh platter 111 can include an appropriately formed cutout 164 configured to accommodate the appropriate portion of the imaging assembly 113.

Additionally, the platter 111 or the lower housing portion 112 can include a cover or a suitable vertically extending protrusion 166 configured to protect the imaging assembly 113 from foreign items that may come in contact therewith.

Referring now to FIGS. 2-6, the FOV 158 of the imaging assembly 113 may be oriented in the direction of the product scanning region in any desirable manner. In some implementations the FOV 158 imaging assembly 113 is oriented with respect to the FOV 140 of the imaging assembly 136 such that the angle α between the optical axis 142 and the optical axis 160 exceeds 90 degrees. In a preferred embodiment, this angle α is between 110 degrees and 180 degrees.

While the FOV 158 can have any desired cross-section, in a preferred embodiment it includes a rectangular cross-section with a first lateral 168 boundary extending above the first lateral edge 130 of the weight platter, a second lateral boundary 170 extending above the second lateral edge 132 of the weight platter, a proximal boundary 172 extending nearer the proximal edge 128 of the weigh platter than a distal boundary 174, and the distal boundary 174 extending nearer the distal edge 134 of the weigh platter than the proximal boundary 172.

Figure 6:
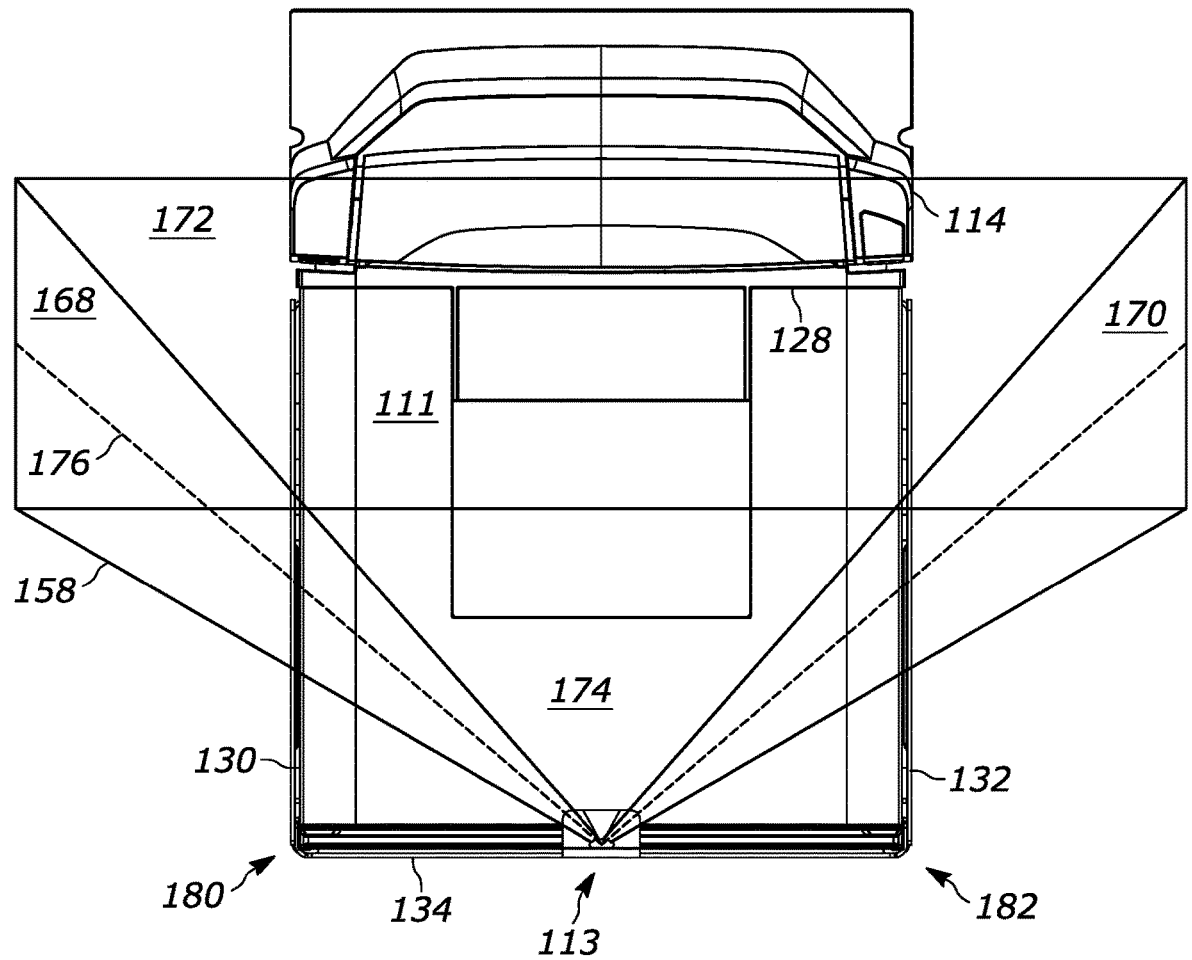
FIG. 6 is a top view of an example barcode reader in accordance with an embodiment of the present invention.

In some embodiment, viewed along a vertical axis as shown in FIG. 6, a central axis 176 of the first lateral boundary 168 extends over the first lateral edge 130 of the weight platter 111 in a first one-half of the first lateral edge 130, the first one-half of the first lateral edge extending away from the distal edge 134 of the weigh platter 111. Additionally, in some embodiments the proximal boundary 172 extends over the proximal edge 128 of the weight platter 111 at a height between 0 and 2 inches above the transverse plane. This is measured above the proximal edge 128 of the weight platter.

In some embodiments the barcode reader 106 can be commented to or include a point-of-sale user interface (POSUI) 178. The POSUI can be communicatively coupled to the barcode reader 106 and can be generally positioned above the upper housing portion 114. The POSUI can include devices like a display (touchscreen or passive), keyboard, credit-card processing device, and the like. In some embodiments, the imaging assembly 113 is configured such that its FOV 158, or at least a portion thereof, is directed in a generally upward direction (such as what is shown in FIG. 2) such that the at least the portion of that FOV 158 captures at least some portion of the POSUI 178 positioned above the upper housing portion of the barcode reader. Having image data that includes the POSUI can help identify instances of shrink events. For example, when an item is scanned and entered into the transaction log, a user may subsequently interact with the POSUI to remove that item from the transaction or otherwise alter its price. Having image data (in the form of photographs or video) can help identify instances of such behavior and trigger appropriate mitigating response(s).

In should be appreciated what any of the image sensors noted in this disclosure can be either monochrome or polychrome (i.e., colored). However, in a preferred embodiment the primary imaging assemblies 136 and 148 include monochrome image sensors and the imaging assembly 113 includes a colored image sensor.

In some implementations the barcode reader can include multiple secondary imaging assemblies 113 that are positioned near the distal edge 134 of the weigh platter 111. For example, rather than having a single assembly 113 positioned in the central region of the edge 134, the barcode reader can be configured such that two imaging assemblies 113 are positioned along the distal edge 134. In an embodiment of this example, one assembly 113 may be positioned near the corner region 180 near the first lateral edge 130 and another assembly 113 may be positioned near the corner region 182 near the second lateral edge 132. In such implementation each of the imaging assemblies 113 can have its respective FOV 158 with its respective central imaging axis and can be configured such that angle between each of the respective central imaging axes and the central axis 142 of the imaging assembly 136 exceeds 90 degrees. In this case it is also preferable to have the angle between respective central imaging axes of the two imaging assemblies 113 be less than 110 degrees.

While each of the imaging assemblies disclosed herein may include similar or identical components, data received from each of the assemblies may be processed in accordance with respectively predefined criteria. For example, image data received from imaging assemblies 136, 148 may be processed primarily for the detection and decoding of barcodes that may appear within the respective FOVs. While this may be an objective of image analysis coming from these assemblies, this should not be interpreted as limiting and image data from these assemblies can further be used for object and/or object characteristic detection. Conversely, image data received from imaging assembly 113 may be processed primarily for the object and/or object characteristic detection. Additionally, image data received from any of the image assemblies can be in a form of singular images, image sets, or video streams comprising a plurality of images. It should also be appreciated that the processing of the data from these assemblies can occur via different physical and/or logical pipelines. For example, processing of image data for the detection of a barcode can be handled by a first processing module and the processing of image data for the detection of an item can be processed by a second processing module. These modules can be logically different or they may be implemented on separate hardware components.

The multi-directional orientation of the various FOVs of a barcode reader described herein can also be advantageously used to render an at-least partial three-dimensional representation of an item presented in the product scanning region of the barcode reader 106 and/or determine a dimension associated with the item presented in the product scanning region of the barcode reader 106. This can be done in accordance with the processing criteria described above. However, in this case image data from the imaging assemblies would preferably be processed via the same module.

Having image data from the various orientations disclosed herein can be advantageously used to detect shrink events. For example, a shrink event can be identified by (i) processing image data from the image assembly 136 to identify an item identifier based on an indicia (like a barcode) present in the first image data, (ii) processing the image data from the imaging assembly 113 to identify an item characteristic based on a physical appearance of the item present in that data, and (iii) detecting a mismatch between the item identifier and the item characteristic. For instance, image data from the image assembly 136 can include a barcode that is associated with first item. On the other hand, image data from the imaging assembly 113 can be analyzed to determine that the item appearing with said image data does not display physical characteristics (shape, color, texture, etc.) that should be associated with the first item or includes physical characteristics not associated with the first item. Such a mismatch can be the basis for a potential shrink event and can be used to generate either an alert local to the barcode reader 106 and/or the POSUI 178, be transmitted to appropriate personnel, cause a transaction receipt to include an appropriate marking, and so on.

Similarly, image data from the imaging assembly 138 and 113 can be processed to detect movement within the product scanning region during a timeframe, identify a lack of a decodable indicia being present in the image data during the timeframe, and identify an item being present in the scanning region during the timeframe. Such event can again signal a potential shrink event as an item has been passing through a product scanning region without being added to a transaction log.

The embodiments described herein may be particularly useful for instances where liquids find their way onto the platter of barcode readers. It has been recognized that liquids, when spilled on existing platters have a tendency to transition to regions below the platter, causing structural and electrical issues with barcode readers like those described herein. Similarly, matter which may come off produce can similarly pose issues when it finds its way below the platter. Providing the configurations disclosed herein may reduce those instances as these configurations may help retain foreign matter on a top surface of the platter, allowing a user to remove said matter without causing harm to the reader.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5% The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

We claim:

1. A barcode reader comprising:
 a housing having (i) a lower housing portion with an upper surface facing a product scanning region and a substantially horizontal window and (ii) an upper housing portion extending above the lower housing portion with a substantially upright window;
 a weigh platter configured to support an object placed on the weigh platter for obtaining a weight of the object, the weigh platter having:
  a central region extending in a transverse plane, the central region including a platter window configured to permit light to pass therethrough;
  a proximal edge adjacent the upper housing portion;
  a first lateral edge extending non-parallel to the proximal edge;
  a second lateral edge, opposite the first lateral edge, extending non-parallel to the proximal edge; and
  a distal edge, opposite the proximal edge, extending non-parallel to the first and second lateral edges;
 a first imaging assembly having a first imaging sensor, the first imaging assembly having a first field of view (FOV) directed through at least one of the substantially horizontal window or the substantially upright window; and
 a second imaging assembly having a second imaging sensor, the second imaging assembly having a second FOV and being positioned near the distal edge of the weigh platter, wherein the second FOV is a rectangular FOV that includes:
a first lateral boundary extending above the first lateral edge of the weigh platter;
a second lateral boundary extending above the second lateral edge of the weigh platter;
a proximal boundary extending closer to the proximal edge of the weigh platter than a distal boundary; and
the distal boundary extending closer to the distal edge of the weigh platter than the proximal boundary.

2. The barcode reader of claim 1, wherein the weigh platter comprises at least a portion of the second imaging assembly, and wherein the weigh platter is removable relative to the housing of the barcode reader.

3. The barcode reader of claim 2, wherein the weigh platter comprises a lens of the second imaging assembly, the second imaging sensor, and an imager circuit board supporting the second imaging sensor, and
wherein the lower housing portion comprises a signal processing circuit board communicatively coupled to the imager circuit board and configured to at least partially process second imaging assembly image data.

4. The barcode reader of claim 1, wherein the lower housing portion comprises a lens of the second imaging assembly, the second imaging sensor, and an imager circuit board supporting the second imaging sensor.

5. The barcode reader of claim 4, wherein the distal edge includes a cutout configured to accommodate at least a portion of the second imaging assembly.

6. The barcode reader of claim 4, wherein the platter includes at least one of a cover over at least a portion of the second imaging assembly or a vertically extending protrusion positioned near at least a portion of the second imaging assembly, the vertically extending protrusion extending above the transverse plane.

7. The barcode reader of claim 1,
wherein at least a portion of the first FOV is directed, at the product scanning region, through the substantially upright window along a first central axis,
wherein the second FOV is directed, at the product scanning region, along a second central axis, and
wherein an angle between the first central axis and the second central axis exceeds 90 degrees.

8. The barcode reader of claim 7, wherein the angle is between 110 degrees and 180 degrees.

9. The barcode reader of claim 1, wherein, viewed along a vertical axis, the proximal boundary extends over the proximal edge of the weigh platter at height between 0 and 2 inches above the transverse plane, as measured above the proximal edge of the weigh platter.

10. The barcode reader of claim 1, wherein, viewed along a vertical axis, a central axis of the first lateral boundary extends over the first lateral edge of the weigh platter in a first one-half of the first lateral edge, the first one-half of the first lateral edge extending away from the distal edge of the weigh platter.

11. The barcode reader of claim 1, wherein at least a portion of the second FOV is directed in a upward direction such that the at least the portion of the second FOV captures a point-of-sale display positioned above the upper housing portion.

12. The barcode reader of claim 1, wherein the first imaging sensor is a monochrome imaging sensor, and the second imaging sensor is a color imaging sensor.

13. The barcode reader of claim 1, further comprising:
a third imaging assembly having a third imaging sensor, the third imaging assembly having a third FOV and being positioned near the distal edge of the weigh platter.

14. The barcode reader of claim 13, wherein the second imaging assembly is further positioned near the first lateral edge of the weigh platter, and wherein the third imaging assembly is further positioned near the second lateral edge of the weigh platter.

15. The barcode reader of claim 13, wherein:
at least a portion of the first FOV is directed, at the product scanning region, through the substantially upright window along a first central axis;
the second FOV is directed, at the product scanning region, along a second central axis;
the third FOV is directed, at the product scanning region, along a third central axis;
a first angle between the first central axis and the second central axis exceeds 90 degrees;
a second angle between the first central axis and the third central axis exceeds 90 degrees; and
a third angle between the second central axis and the third central axis is less than 110 degrees.

16. The barcode reader of claim 1, further comprising a microcontroller communicatively coupled to the first imaging assembly and the second imaging assembly, the microcontroller configured to process first image data received from the first imaging assembly based on a first criteria and second image data received from the second imaging assembly based on a second criteria.

17. The barcode reader of claim 16, wherein, based on processing the first image data and the second image data, the microcontroller is further configured to at least one of (i) render an at-least partial three-dimensional representation of an item presented in the product scanning region of the barcode reader or (ii) determine a dimension associated with the item presented in the product scanning region of the barcode reader.

18. The barcode reader of claim 16, wherein, based on processing the first image data and the second image data, the microcontroller is further configured to identify an instance of a shrink event where the item has passed through the product scanning region without being added to a transaction log.

19. The barcode reader of claim 18, wherein the microcontroller is further configured to identify the instance of the shrink event by (i) processing the first image data to identify an item identifier based on an indicia present in the first image data, (ii) processing the second image data to identify an item characteristic based on a physical appearance of the item present in the second image data, and (iii) detecting a mismatch between the item identifier and the item characteristic.

20. The barcode reader of claim 18, wherein the microcontroller is further configured to identify the instance of the shrink event by (i) processing at least one of the first image data or the second image data to detect movement within the product scanning region during a timeframe, (ii) processing the first image data to identify a lack of a decodable indicia being present in the first image data during the timeframe, and (iii) processing the second image data to identify an item being present in the scanning region during the timeframe.

21. The barcode reader of claim 1, wherein the second FOV does not pass through the substantially horizontal window.

22. A barcode reader comprising:
a housing having (i) a lower housing portion with an upper surface facing a product scanning region and a substantially horizontal window and (ii) an upper housing portion extending above the lower housing portion with a substantially upright window;
a weigh platter configured to support an object placed on the weigh platter for obtaining a weight of the object, the weigh platter having:
   a central region extending in a transverse plane, the central region including a platter window configured to permit light to pass therethrough;
   a proximal edge adjacent the upper housing portion;
   a first lateral edge extending non-parallel to the proximal edge;
   a second lateral edge, opposite the first lateral edge, extending non-parallel to the proximal edge; and
   a distal edge, opposite the proximal edge, extending non-parallel to the first and second lateral edges;
a first imaging assembly having a first imaging sensor, the first imaging assembly having a first field of view (FOV) directed through at least one of the substantially horizontal window or the substantially upright window; and
a second imaging assembly having a second imaging sensor, the second imaging assembly having a second FOV and being positioned near the distal edge of the weigh platter,
wherein the first imaging sensor is a monochrome imaging sensor, and the second imaging sensor is a color imaging sensor.

23. The barcode reader of claim 22, wherein the weigh platter comprises at least a portion of the second imaging assembly, and wherein the weigh platter is removable relative to the housing of the barcode reader.

24. The barcode reader of claim 23, wherein the weigh platter comprises a lens of the second imaging assembly, the second imaging sensor, and an imager circuit board supporting the second imaging sensor, and
   wherein the lower housing portion comprises a signal processing circuit board communicatively coupled to the imager circuit board and configured to at least partially process second imaging assembly image data.

25. The barcode reader of claim 22, wherein the lower housing portion comprises a lens of the second imaging assembly, the second imaging sensor, and an imager circuit board supporting the second imaging sensor.

26. The barcode reader of claim 25, wherein the distal edge includes a cutout configured to accommodate at least a portion of the second imaging assembly.

27. The barcode reader of claim 25, wherein the platter includes at least one of a cover over at least a portion of the second imaging assembly or a vertically extending protrusion positioned near at least a portion of the second imaging assembly, the vertically extending protrusion extending above the transverse plane.

28. The barcode reader of claim 22, wherein the second FOV is a rectangular FOV that includes:
   a first lateral boundary extending above the first lateral edge of the weigh platter;
   a second lateral boundary extending above the second lateral edge of the weigh platter;
   a proximal boundary extending closer to the proximal edge of the weigh platter than a distal boundary; and
   the distal boundary extending closer to the distal edge of the weigh platter than the proximal boundary, and
wherein at least one of:
   (i) viewed along a vertical axis, the proximal boundary extends over the proximal edge of the weigh platter at second height between 0 and 2 inches above the transverse plane, as measured above the proximal edge of the weigh platter; or
   (ii) wherein, viewed along a vertical axis, a central axis of the first lateral boundary extends over the first lateral edge of the weigh platter in a first one-half of the first lateral edge, the first one-half of the first lateral edge extending away from the distal edge of the weigh platter.

29. The barcode reader of claim 22, further comprising:
a third imaging assembly having a third imaging sensor, the third imaging assembly having a third FOV and being positioned near the distal edge of the weigh platter.

30. The barcode reader of claim 29, wherein the second imaging assembly is further positioned near the first lateral edge of the weigh platter, and wherein the third imaging assembly is further positioned near the second lateral edge of the weigh platter.

31. A barcode reader comprising:
a housing having (i) a lower housing portion with an upper surface facing a product scanning region and a substantially horizontal window and (ii) an upper housing portion extending above the lower housing portion with a substantially upright window;
a weigh platter configured to support an object placed on the weigh platter for obtaining a weight of the object, the weigh platter having:
   a central region extending in a transverse plane, the central region including a platter window configured to permit light to pass therethrough;
   a proximal edge adjacent the upper housing portion;
   a first lateral edge extending non-parallel to the proximal edge;
   a second lateral edge, opposite the first lateral edge, extending non-parallel to the proximal edge; and
   a distal edge, opposite the proximal edge, extending non-parallel to the first and second lateral edges;
a first imaging assembly having a first imaging sensor, the first imaging assembly having a first field of view (FOV) directed through at least one of the substantially horizontal window or the substantially upright window;
a second imaging assembly having a second imaging sensor, the second imaging assembly having a second FOV and being positioned near the distal edge of the weigh platter; and
a third imaging assembly having a third imaging sensor, the third imaging assembly having a third FOV and being positioned near the distal edge of the weigh platter,
wherein the second imaging assembly is further positioned near the first lateral edge of the weigh platter, and wherein the third imaging assembly is further positioned near the second lateral edge of the weigh platter, and
wherein:
   at least a portion of the first FOV is directed, at the product scanning region, through the substantially upright window along a first central axis;
   the second FOV is directed, at the product scanning region, along a second central axis;
   the third FOV is directed, at the product scanning region, along a third central axis;

a first angle between the first central axis and the second central axis exceeds 90 degrees;
a second angle between the first central axis and the third central axis exceeds 90 degrees; and
a third angle between the second central axis and the third central axis is less than 110 degrees.

32. The barcode reader of claim 31, wherein the lower housing portion comprises a lens of the second imaging assembly, the second imaging sensor, and an imager circuit board supporting the second imaging sensor.

33. The barcode reader of claim 32, wherein the distal edge includes a cutout configured to accommodate at least a portion of the second imaging assembly.

34. The barcode reader of claim 31, wherein the second FOV is a rectangular FOV that includes:
a first lateral boundary extending above the first lateral edge of the weigh platter;
a second lateral boundary extending above the second lateral edge of the weigh platter;
a proximal boundary extending closer to the proximal edge of the weigh platter than a distal boundary; and
the distal boundary extending closer to the distal edge of the weigh platter than the proximal boundary, and wherein at least one of:
(i) viewed along a vertical axis, the proximal boundary extends over the proximal edge of the weigh platter at second height between 0 and 2 inches above the transverse plane, as measured above the proximal edge of the weigh platter; or
(ii) wherein, viewed along a vertical axis, a central axis of the first lateral boundary extends over the first lateral edge of the weigh platter in a first one-half of the first lateral edge, the first one-half of the first lateral edge extending away from the distal edge of the weigh platter.

35. A barcode reader comprising:
a housing having (i) a lower housing portion with an upper surface facing a product scanning region and a substantially horizontal window and (ii) an upper housing portion extending above the lower housing portion with a substantially upright window;
a weigh platter configured to support an object placed on the weigh platter for obtaining a weight of the object, the weigh platter having:
a central region extending in a transverse plane, the central region including a platter window configured to permit light to pass therethrough;
a proximal edge adjacent the upper housing portion;
a first lateral edge extending non-parallel to the proximal edge;
a second lateral edge, opposite the first lateral edge, extending non-parallel to the proximal edge; and
a distal edge, opposite the proximal edge, extending non-parallel to the first and second lateral edges;
a first imaging assembly having a first imaging sensor, the first imaging assembly having a first field of view (FOV) directed through at least one of the substantially horizontal window or the substantially upright window;
a second imaging assembly having a second imaging sensor, the second imaging assembly having a second FOV and being positioned near the distal edge of the weigh platter; and
a microcontroller communicatively coupled to the first imaging assembly and the second imaging assembly, the microcontroller configured to process first image data received from the first imaging assembly based on a first criteria and second image data received from the second imaging assembly based on a second criteria.

36. The barcode reader of claim 35, wherein, based on processing the first image data and the second image data, the microcontroller is further configured to at least one of (i) render an at-least partial three-dimensional representation of an item presented in the product scanning region of the barcode reader or (ii) determine a dimension associated with the item presented in the product scanning region of the barcode reader.

37. The barcode reader of claim 35, wherein, based on processing the first image data and the second image data, the microcontroller is further configured to identify an instance of a shrink event where the item has passed through the product scanning region without being added to a transaction log.

38. The barcode reader of claim 37, wherein the microcontroller is further configured to identify the instance of the shrink event by (i) processing the first image data to identify an item identifier based on an indicia present in the first image data, (ii) processing the second image data to identify an item characteristic based on a physical appearance of the item present in the second image data, and (iii) detecting a mismatch between the item identifier and the item characteristic.

39. The barcode reader of claim 37, wherein the microcontroller is further configured to identify the instance of the shrink event by (i) processing at least one of the first image data or the second image data to detect movement within the product scanning region during a timeframe, (ii) processing the first image data to identify a lack of a decodable indicia being present in the first image data during the timeframe, and (iii) processing the second image data to identify an item being present in the scanning region during the timeframe.

40. The barcode reader of claim 35, wherein the weigh platter comprises at least a portion of the second imaging assembly, and wherein the weigh platter is removable relative to the housing of the barcode reader.

41. The barcode reader of claim 40, wherein the weigh platter comprises a lens of the second imaging assembly, the second imaging sensor, and an imager circuit board supporting the second imaging sensor, and
wherein the lower housing portion comprises a signal processing circuit board communicatively coupled to the imager circuit board and configured to at least partially process second imaging assembly image data.

42. The barcode reader of claim 40, wherein the distal edge includes a cutout configured to accommodate at least a portion of the second imaging assembly.

43. The barcode reader of claim 40, wherein the platter includes at least one of a cover over at least a portion of the second imaging assembly or a vertically extending protrusion positioned near at least a portion of the second imaging assembly, the vertically extending protrusion extending above the transverse plane.

44. The barcode reader of claim 35, wherein the lower housing portion comprises a lens of the second imaging assembly, the second imaging sensor, and an imager circuit board supporting the second imaging sensor.

45. The barcode reader of claim 35, wherein the second FOV is a rectangular FOV that includes:
a first lateral boundary extending above the first lateral edge of the weigh platter;
a second lateral boundary extending above the second lateral edge of the weigh platter;
a proximal boundary extending closer to the proximal edge of the weigh platter than a distal boundary; and the distal boundary extending closer to the distal edge of the weigh platter than the proximal boundary, and
wherein at least one of:
  (i) viewed along a vertical axis, the proximal boundary extends over the proximal edge of the weigh platter at second height between 0 and 2 inches above the transverse plane, as measured above the proximal edge of the weigh platter; or
  (ii) wherein, viewed along a vertical axis, a central axis of the first lateral boundary extends over the first lateral edge of the weigh platter in a first one-half of the first lateral edge, the first one-half of the first lateral edge extending away from the distal edge of the weigh platter.

46. The barcode reader of claim 35, further comprising:
a third imaging assembly having a third imaging sensor, the third imaging assembly having a third FOV and being positioned near the distal edge of the weigh platter.

47. The barcode reader of claim 46, wherein the second imaging assembly is further positioned near the first lateral edge of the weigh platter, and wherein the third imaging assembly is further positioned near the second lateral edge of the weigh platter.

* * * * *